June 29, 1954

W. A. ANDRES ET AL 2,682,601

BEVERAGE MAKER

Filed April 5, 1948

INVENTORS
WILLIAM A. ANDRES
CLEMENT WOOD CLEMONS
CLEMENT E TRETTEL
BY William C. Babcock
ATTORNEY Patented June 29, 1954

2,682,601

UNITED STATES PATENT OFFICE 2,682,601

BEVERAGE MAKER

William A. Andres, Clement Wood Clemons, and Clement E. Trettel, Minneapolis, Minn., assignors to General Mills, Inc., a corporation of Delaware Application April 5, 1948, Serial No. 18,874

9 Claims. (Cl. 219—43)

The present invention relates to beverage makers and more particularly to beverage makers of the type in which liquid from an upper reservoir passes downwardly through a suitable heating unit, after which it drops by gravity through a mass of infusion material such as coffee, and then into a bottom receptacle such as a pot or cup.

One object of the invention is to provide an improved beverage maker of this general type.

Another object is the provision of an improved heating unit for such a beverage maker.

A further object is the provision of a heating unit for such a beverage maker, in which the heating unit has an improved handle and cord assembly.

Another object is to provide a heating unit which may be used with receptacles of different sizes.

Still another object is the provision of an improved handle assembly which shall include latching means for an upper liquid reservoir.

Another object is the provision of an improved method of attachment of an infusion basket to the heating unit.

A further object is to provide an improved metering orifice for the bottom of the upper liquid reservoir.

Other objects and advantages will be apparent from the following specification.

In the drawings, wherein like reference characters indicate like parts,

Figure 1:
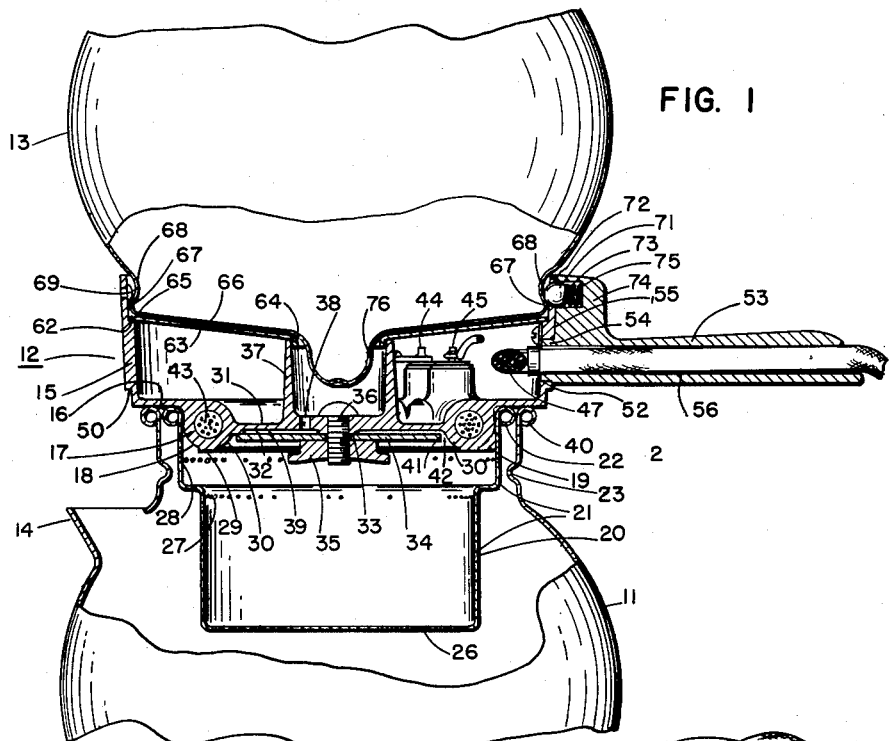
Figure 1 is a sectional view of a coffeemaker embodying features of the present invention.

As shown in Fig. 1, the coffeemaker, according to the present invention involves a bottom receptacle 11 (which may be either a regular coffee pot or cup or similar receptacle), an intermediate heater housing 12, and an upper bowl or liquid reservoir 13. A basket 20 for the infusion material is attached below the heater housing in a manner to be described. Thus, the liquid from the upper reservoir will flow downwardly under the action of gravity through the heater where it will be brought to the required temperature. The heated liquid will then pass through the infusion basket and down into the lower receptacle.

Receptacle 11 may be provided with a suitable pouring spout 14 and a handle (not shown) of any desired construction. The lower receptacle shown in the drawings is made of metal although it will be apparent that a ceramic or glass pot could also be employed. The upper edge of the pot 11 is rolled over to provide a bead or seat 40 on which the heater housing is adapted to be supported.

The heater housing, designated generally as 12, includes a substantially cylindrical vertical side wall portion 15 and a horizontal bottom portion 16. Thus, the heater housing is substantially cup shaped. The flat bottom portion 16 is adapted to rest on the rim of pot 11 and be supported by the seat 40. The rim of the infusion basket 20 which is fastened to the bottom of this heating unit may serve as a centering means to prevent excessive lateral movement of the unit on top of the pot 11.

To permit use of the unit with pots which have a larger top opening than that of pot 11, an additional downwardly facing seat has been provided on housing wall 15. In the form shown, the lower portion of wall 15 is recessed or reduced in diameter to provide an annular step or shoulder 50. This step will engage the rim of a pot of corresponding size, while the lower recessed housing portion adjacent and below the step serves to center the unit in the pot opening. Thus the housing construction provides two effective steps or seats for selective engagement with receptacles which have top openings of different sizes.

Figure 4:
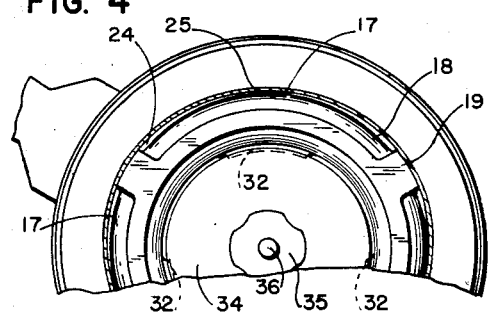
Fig. 4 is a partial bottom view of the heater housing.

The central portion of bottom 16 projects downwardly, as shown at 17, this downward projection 17 being curved smoothly inward as shown at 18. Spaced projections 19, best shown in Figs. 1 and 4, are provided on the downward projecting portion 17 for the purpose of supporting the coffee basket thereon. This coffee basket 20 may be of any desired shape. In the form shown, it has an upper enlarged cylindrical section 21 which terminates in an upper bead 22. The inside radius of this upper portion 21 is slightly greater than the outside radius of the depending central portion 17 of the heater housing. However, the projections 19 on the portion 17 extend outwardly to give an effective radius for these projections slightly greater than the inside radius of the coffee basket portion 21. Thus, as the coffee basket is placed against the bottom of the heater housing the upper portion of this basket will be deformed slightly as shown in Fig. 4 so that there is slightly more space as at 24 between the inside of the basket and the outside of the portion 17 immediately adjacent projections 19 than the space 25 between these parts at points intermediate the projections 19. In other words, the top of the coffee basket is resiliently deformed to somewhat non-circular configuration and this resilient deformation causes the basket to grip projections 19 firmly and thus maintains the coffee basket and contents in place through the increased friction and clamping action between the parts.

The construction of the coffee basket 20, as indicated above, may be of any orthodox type and as is customary, this basket is provided with bottom perforations 26 and with one or more rows of top perforations 27 and 28 to take care of possible overflow of the infusing liquid from the basket.

With reference to the heater housing again, the depending central portion 17 has a small annular shoulder 29 shown in Fig. 1. The portion of the bottom inside this annular shoulder 29 is recessed upwardly as shown at 30 to provide a flat central area 31 positioned somewhat above the extreme bottom point 29 of depending portion 17. Spaced peripheral shoulders 32 and a central shoulder 33 are located in said central recess 31 to serve as positioning means for a removable plate 34. This plate is held against the shoulder portion by a removable nut 35 which engages a threaded member 36 projecting downwardly from the center of the heater housing. Thus it will be apparent that plate 34 is readily detachable from the bottom of the heater housing merely by removal of nut 35. This removability is of interest and importance in facilitating the cleaning and removal of scale and other deposits from the heater housing.

The central portion of the heater housing includes an upwardly extending cylindrical wall or cup 37 which forms a central recess into which liquid from the upper reservoir may flow. Perforations or passages 38 permit the liquid to flow from the inside of this central recessed portion 37 down to the space 39 between the plate 34 and the bottom central portion 31 of the heater housing 12. These perforations 38 are located near the center of the heater housing and plate 34 so that the liquid which reaches space 39 then flows outwardly through the space 39 to the outer rim 41 of plate 34. This outer rim 41 is spaced slightly as shown at 42 from the upwardly curved edge 30 of the central bottom recess in the heater housing.

As clearly shown in the drawing, a heating element 43 is mounted in close heat-conducting relation to the depending central portion 17 of the heater housing. In the embodiment shown in the drawing this electrical heating element 43 is cast into the housing 12 during manufacture of the latter. From the drawing it will be apparent that the cast-in heating element 43 is in the center of the depending annular portion 17 and thus heats this annular portion uniformly. The heat from the element is also conducted throughout the central bottom portion 31 of the housing. Also, by reason of the contact of the plate 34 through peripheral and central shoulders 32 and 33, a portion of the heat from the element is conducted to plate 34. Thus, as the liquid flows through the spaces 39 and 42, it is heated to the desired temperature for the infusion operation. The heated liquid then drops from the rim of plate 34 into the infusion material which is contained in the coffee basket 20, and the infused product finally passes downwardly through perforations 26 into the bottom receptacle 11.

The heating element 43 is provided with terminals 44 and 45. One of these terminals 44 is connected directly to one of the conductors 46 of a suitable connecting cord 47. The other terminal 45 is preferably connected by a wire 48 to one terminal of a suitable thermostatic switch 49. This thermostatic switch is mounted on the central recessed bottom portion 31 in close heat-conducting relation with said portion. The other terminal of this thermostatic switch 49 is connected to the other conductor 51 of the connecting cord 47. The thermostatic switch 49 is designed to remain closed during normal operation of the unit as long as liquid is flowing from the upper reservoir through the spaces 39 and 42. As this liquid is raised in temperature, it uses up most of the heat supplied by the element 43 and thus the thermostat switch remains in closed position. As soon as the reservoir runs dry, the absence of liquid permits the heat from element 43 to raise the temperature of central bottom portion 31 to a sufficient degree to open the thermostatic switch 49 and break the circuit to the heating element. Such safety thermostats are well known and their construction need not be described in detail.

An improved arrangement for connection of the cord 47 to the heater housing has been provided. In this arrangement, the side wall 15 of the housing 12 is provided with an opening 52. A handle 53 of plastic or other suitable material is provided with a projection 54 adapted to fit within the opening 52. The portion of the handle adjacent this reduced circular projection 54 serves as a shoulder 55 to assist in positioning the handle against the side wall of the housing.

A longitudinal passageway 56 extends throughout the length of the handle 53 and projection 54 and serves as an entrance housing for the cord 47. The cord extends through this passageway from the outer end of the handle to the inside of the housing. A cord clamp or strain relief device 57 is fastened to the cord inside the housing and this clamp 57 in turn has a flat surface 58 positioned against the inner side of wall 15. A bolt or screw 59 passes through this flat portion 58 of the clamp 57, through the side wall 15, and into the body portion of handle 53. Thus, this single threaded member serves to hold the cord clamp in place on the inside of the side wall and also serves to clamp the handle against the outside of the wall. One or more additional screws 61 may be provided to strengthen the handle mounting, if desired.

Figure 3:
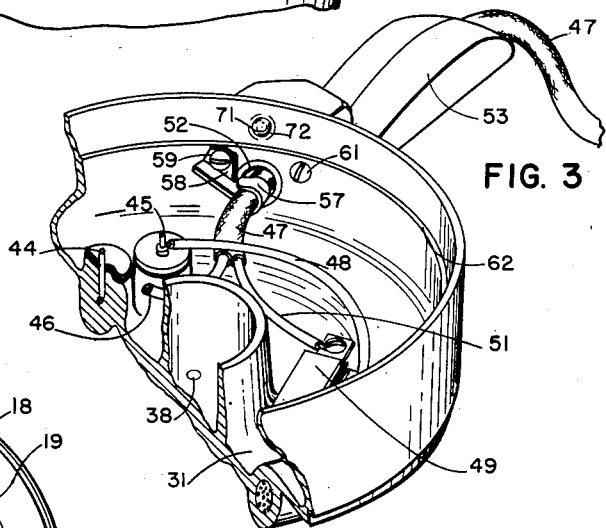
Fig. 3 is a partial perspective view of the interior of the heater housing showing details of the cord connection.

The heater housing 12 is also provided with positioning means for supporting the upper reservoir or bowl 13. As shown in Figs. 1 and 3, the upper portion of the side wall 15 is provided with an internal ledge or projection 62. This ledge is somewhat higher than the top of the central hub or cup 37. A slightly dish-shaped or conical plate member 63 is supported on the top of the shoulder 62 and cup 37. The inner portion of plate 63 may be flanged downwardly at 64 inside the wall of the central hub 37. The outer rim 65 of plate 63 rests on the ledge 62 as shown. Plate 63 may be held in place by suitable screws (not shown) and, if desired, a liquid-tight gasket may be utilized to seal the joints between the edges of plate 63 and the side wall 15 or hub 37 of the housing.

The upper liquid reservoir 13 has a conical or dished bottom portion 66 shaped to correspond to the slope of plate 63. At the outer periphery of this bottom portion 66, the reservoir has a projecting annular shoulder 67, the outer diameter of which is just slightly less than the inside diameter of the side wall 15 above plate 63. Thus, the annular shoulder 67 serves as a positioning means to locate the reservoir 13 laterally within the housing 12. An annular groove 68 in the wall or bowl 13 just above the annular projection 67 provides space for suitable retaining members adapted to hold the bowl in position on top of housing 12.

One of these retaining members may be in the form of a fixed projection or rivet 69 at a point substantially opposite the location of handle 53. The other part of the retaining mechanism is shown in the form of a ball 71, which projects partially through an opening 72 in the side wall 15 of the heater housing just above the axis of handle 53. A recess 73 in the enlarged upper portion 74 of handle 53 serves as a housing for the ball 71 and for a suitable spring 75 which urges the ball inwardly against the side wall 15. Thus the opening in the side wall and the recess 73 in the handle portion 74 cooperate to serve as a positioning and retaining housing for the latching member or ball 71. When the upper bowl 13 is placed on the heater housing a portion of annular projection 67 is first engaged beneath fixed projection 69 with bowl 13 at a slight angle. The bowl is then lowered to a horizontal position and in the course of this movement the portion of annular projection 67 adjacent the handle forces the ball 71 back into its housing against the action of spring 75 and then permits the ball to snap into place above the projection in the annular recess 68 to latch the upper bowl in place and prevent accidental displacement of the bowl.

Figure 2:
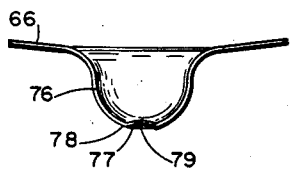
Fig. 2 is an enlarged partial sectional view of the bottom of the liquid reservoir.

The central bottom portion of bowl 13 extends downwardly as shown at 76 to project into the central hub or cup 37 of the heater housing. As shown in Fig. 2 the downward projection or well 76 has a small central area which is deformed upwardly at 77. In the upper most portion of this area 77 a metering orifice 79 is provided. Thus orifice 79 is located in a small recess above the lowest portion of the upper bowl. This construction is advantageous because it prevents damage to the edges of the orifice 79 in the event the bowl is dropped carelessly on a table or other hard surface. In such a case, in previous forms of construction, wherein the liquid orifice has been at the lowest point of the reservoir, the walls of the opening themselves may be deformed and thus the effective size of the opening may be changed. In the present case, however, any contact of the bowl against a table or similar surface will be borne by the lowest portion 78 of the well 76 and although this portion may be slightly deformed, the edges of the opening 79 will be protected.

The size of opening 79 is selected so as to obtain the desired rate of flow of the liquid contents from the upper reservoir to the heater unit. This time of flow will be coordinated with the amount of heat produced by the heating element 43 so that the liquid which flows downwardly, under the influence of gravity, through the spaces 39 and 42 will just have time to reach the desired temperature before it drops into the coffee basket. Since the size of the opening must be kept within narrow predetermined limits in any given assembly, it is important to protect the opening against accidental deformation as described above.

As shown in Fig. 1, an additional feature of the invention will be described. This feature involves the provision of a projection or rim 23 extending inwardly from the neck of the pot 11. This inwardly projecting portion 23 has an internal diameter which is somewhat less than the greatest diameter of the bead 22 on coffee basket 20. Thus a positive safety means is provided which prevents the coffee basket 20 from dropping into the liquid in the bottom receptacle 11 in case the device is subjected to unexpected jars which might be sufficient to overcome the frictional and resilient clamping forces normally holding the coffee basket against the depending central portion 17 of housing 12.

The operation of this device will be readily apparent from the foregoing description. The desired amount of coffee or other infusion material is placed in the basket 20 after which this basket is frictionally engaged against the bottom of heater housing 12. The desired amount of liquid is placed in the upper bowl 13 and this bowl is positioned on top of the heater housing 12. Housing 12 in turn is placed on top of bottom receptacle 11. Cord 47 is connected to a suitable source of current and will thus energize the heating element 43 to heat the liquid, in the manner described, as it passes from the upper bowl to the infusion basket. The heated liquid will pass through the infusion material and the desired product will flow into the bottom receptacle. After all the liquid has passed out of the heater housing, the temperature of the housing will increase and the thermostatic switch 49 will be opened to stop the operation of heating element 43. The user may then lift the heater housing, upper bowl and coffee basket as a unit by means of handle 53 and may remove these elements from the bottom receptacle 11. The bottom receptacle then serves as a dispensing means for the beverage which has been prepared.

It will be apparent from the foregoing description that an improved coffeemaker of the type described has been provided, which accomplishes the objects set forth in the early portions of this specification. Since minor variations and changes in the exact details of construction will be apparent to persons skilled in this field, it is intended that this invention shall cover all such changes and modifications as fall within the spirit and scope of the attached claims.

Now, therefore, we claim:

1. A beverage making unit comprising a heater housing having a side wall, a liquid reservoir removably positioned above the housing and having a locking shoulder inside the the wall, an opening in said wall above said shoulder, a handle fastened to said heater housing and having a recessed portion positioned outside said wall opening, and adjacent thereto, and a latching member mounted in said recessed portion of the handle and projecting through said opening for engagement above said shoulder.

2. A beverage making unit for insertion in a receptacle having a top opening, said unit comprising a heater housing and a liquid reservoir removably positioned above said housing, a handle attached to said housing, said housing having a wall with an opening therethrough, said handle having a recess aligned with said wall opening, a ball of larger diameter than said opening positioned in said recess, and spring means in said recess normally urging said ball against said opening with a portion of the ball projecting through the opening as a resilient latch for said reservoir.

3. A beverage making unit for insertion in a receptacle having a top opening, said unit comprising a heater housing and a liquid reservoir removably positioned above said housing, said housing having an electrical heating element and a handle, a connection cord for said element passing through said handle, and means mounted in said handle for retaining said reservoir in position on said housing.

4. A beverage making unit for insertion in a receptacle having a top opening, said unit comprising a heater housing and a liquid reservoir positioned above said housing, said housing having an outer wall with an opening, a handle outside said wall having a passageway aligned with said opening, an electric heating element in said housing, an electric cord passing through said handle passageway and opening, a strain relieving clamp engaging said cord inside said wall, and a retaining member engaging said clamp, said wall and said handle to maintain said parts in assembled relation.

5. A beverage making unit for selective insertion in receptacles having top openings of different size, said unit comprising a cup shaped housing having a cylindrical side wall and a flat bottom portion adjacent thereto, the lower portion of the side wall having an annular recess in its outer surface providing a downwardly facing external seat above said bottom portion for engagement with the top of one of said receptacles, and the flat bottom portion of the housing providing an alternate seat for engagement with a different receptacle having a smaller top opening.

6. A beverage making unit comprising a heater housing having a wall with an opening therein, a liquid reservoir removably positioned above said housing and having a locking portion opposite the opening, a handle attached to said housing and having a longitudinal recess axially aligned with said opening, a retaining member longitudinally movable within the recess and having a latch portion projecting through the opening, and resilient means within the recess engaging the retaining member and urging it toward the opening for engagement of said latch portion with said locking portion.

7. A beverage making unit comprising a heater housing having a wall with an opening therein, a liquid reservoir removably positioned above said housing and having a locking portion opposite the opening, a handle attached to said housing and having a longitudinal recess axially aligned with said opening, the width of the recess being greater than that of the opening in at least one direction, a retaining member longitudinally movable within the recess and having a latch portion projecting through the opening, and resilient means within the recess engaging the retaining member and urging it toward the opening for engagement of said latch portion with said locking portion, the width of the retaining member also being greater than that of the opening in said one direction and thereby limiting the resilient movement of the retaining member by engagement of the latter against the housing.

8. An appliance comprising a housing having a wall with an opening therein, a member removably mounted on the housing and having a locking portion inside the housing opposite the opening, a handle attached to the housing and having a portion outside said wall provided with an inwardly facing recess aligned with the wall opening and adjacent thereto, and a latching member movably mounted within said handle recess and projecting through said opening for engagement with said locking portion.

9. A beverage making unit for selective insertion in receptacles having top openings of different size, said unit comprising a cup shaped housing having a cylindrical side wall and a flat bottom portion adjacent thereto, the lower portion of the side wall having an inwardly stepped portion in its outer surface only, thereby providing a side wall portion of reduced thickness and a downwardly facing external seat above said bottom portion for engagement with the top of one of said receptacles, and the flat bottom portion of the housing providing an alternate seat for engagement with a different receptacle having a smaller top opening.

References Cited in the file of this patent

UNITED STATES PATENTS

| Number | Name | Date |
|---|---|---|
| 174,983 | Spencer | Mar. 21, 1876 |
| 656,223 | Sickel | Aug. 21, 1900 |
| 1,006,104 | Kuhn et al. | Oct. 17, 1911 |
| 1,056,049 | Nelson | Mar. 18, 1913 |
| 1,570,807 | Watson | Jan. 26, 1926 |
| 1,582,165 | Cantor | Apr. 27, 1926 |
| 1,597,241 | Marsden | Aug. 24, 1926 |
| 1,761,633 | Krause | June 3, 1930 |
| 1,810,958 | Fullman | June 23, 1931 |
| 1,875,906 | Zarobsky | Sept. 6, 1932 |
| 2,089,665 | Roberts et al. | Aug. 10, 1937 |
| 2,116,044 | Rucker | May 3, 1938 |
| 2,152,122 | Wilcox | Mar. 28, 1939 |
| 2,192,095 | Myers | Feb. 27, 1940 |
| 2,272,471 | Miller | Feb. 10, 1942 |
| 2,290,660 | Wilcox | July 21, 1942 |
| 2,315,455 | Sale | Mar. 30, 1943 |

FOREIGN PATENTS

| Number | Country | Date |
|---|---|---|
| 307,233 | Italy | Apr. 24, 1933 |
| 374,526 | Great Britain | June 16, 1932 |
| 592,084 | Germany | Feb. 1, 1934 |